Sept. 17, 1963  J. CZULAK ETAL  3,103,871
APPARATUS FOR ADDING ONE SUBSTANCE TO ANOTHER
IN CONTROLLED PROPORTIONS
Filed Aug. 19, 1960  3 Sheets-Sheet 3
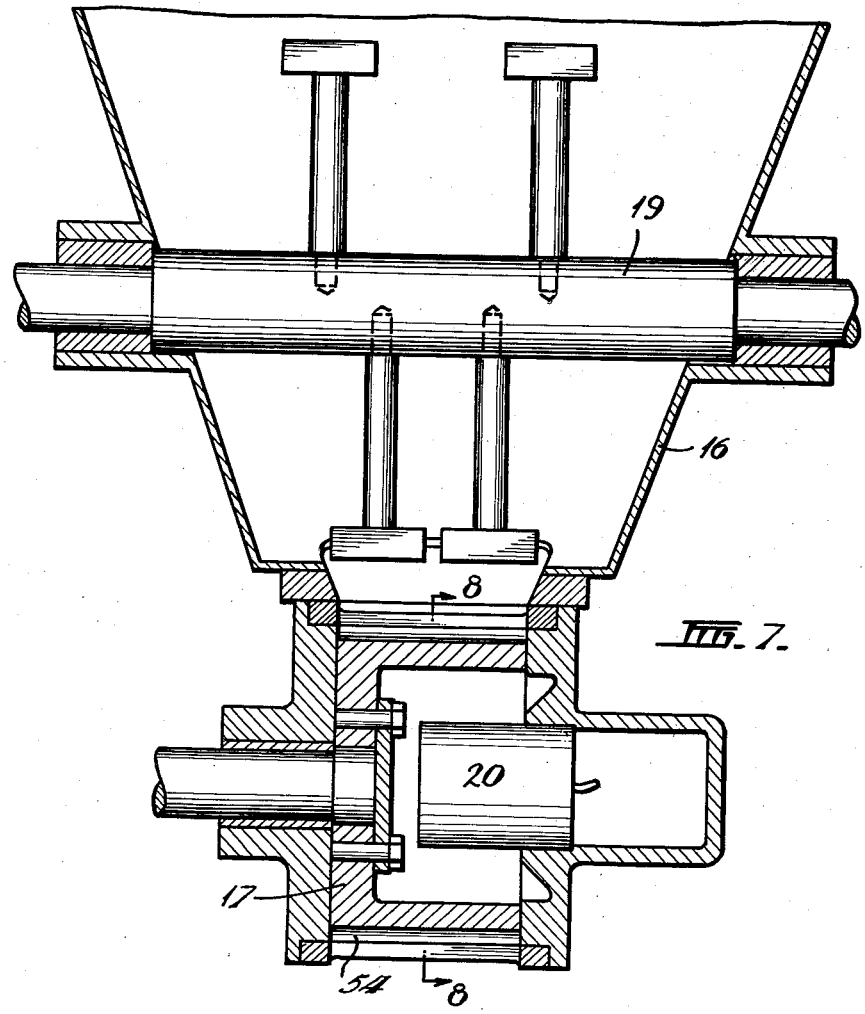
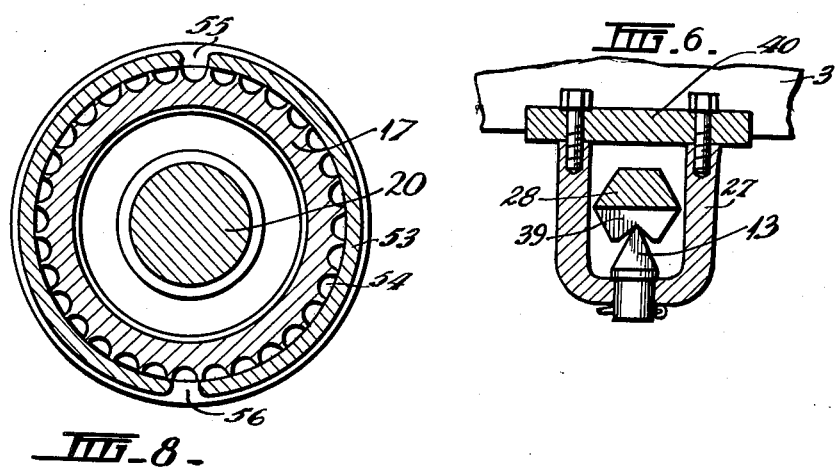

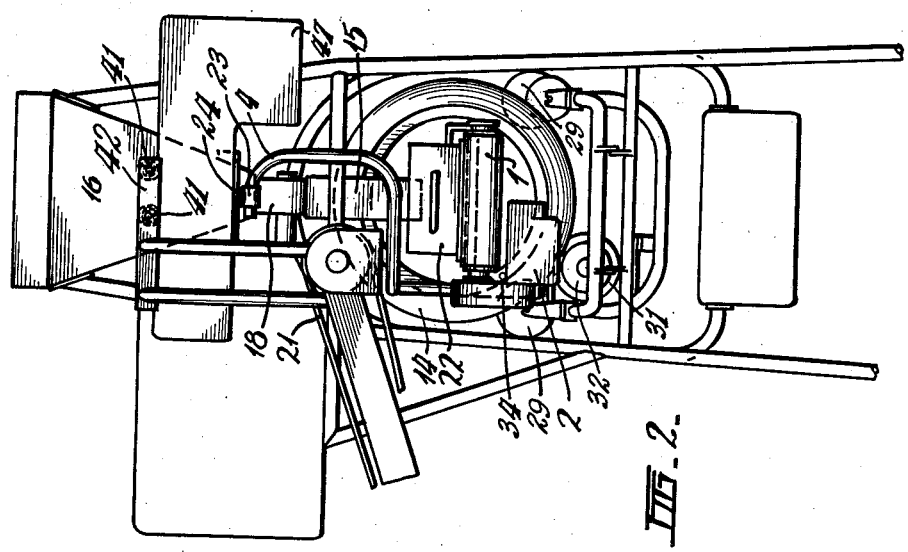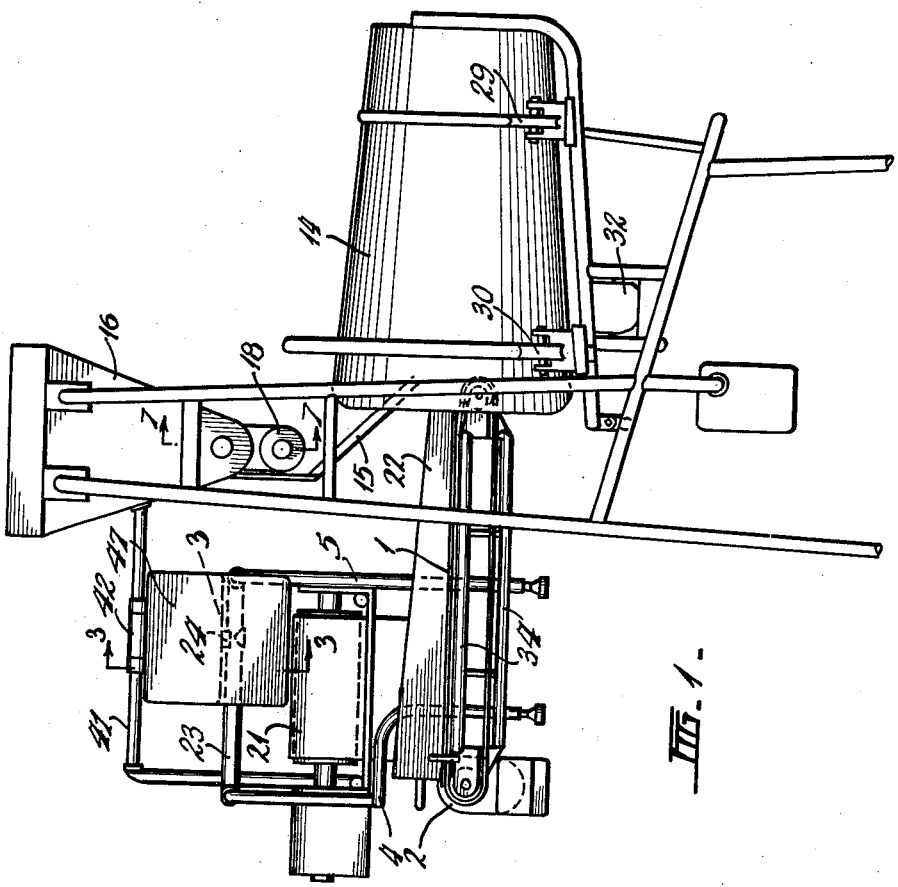

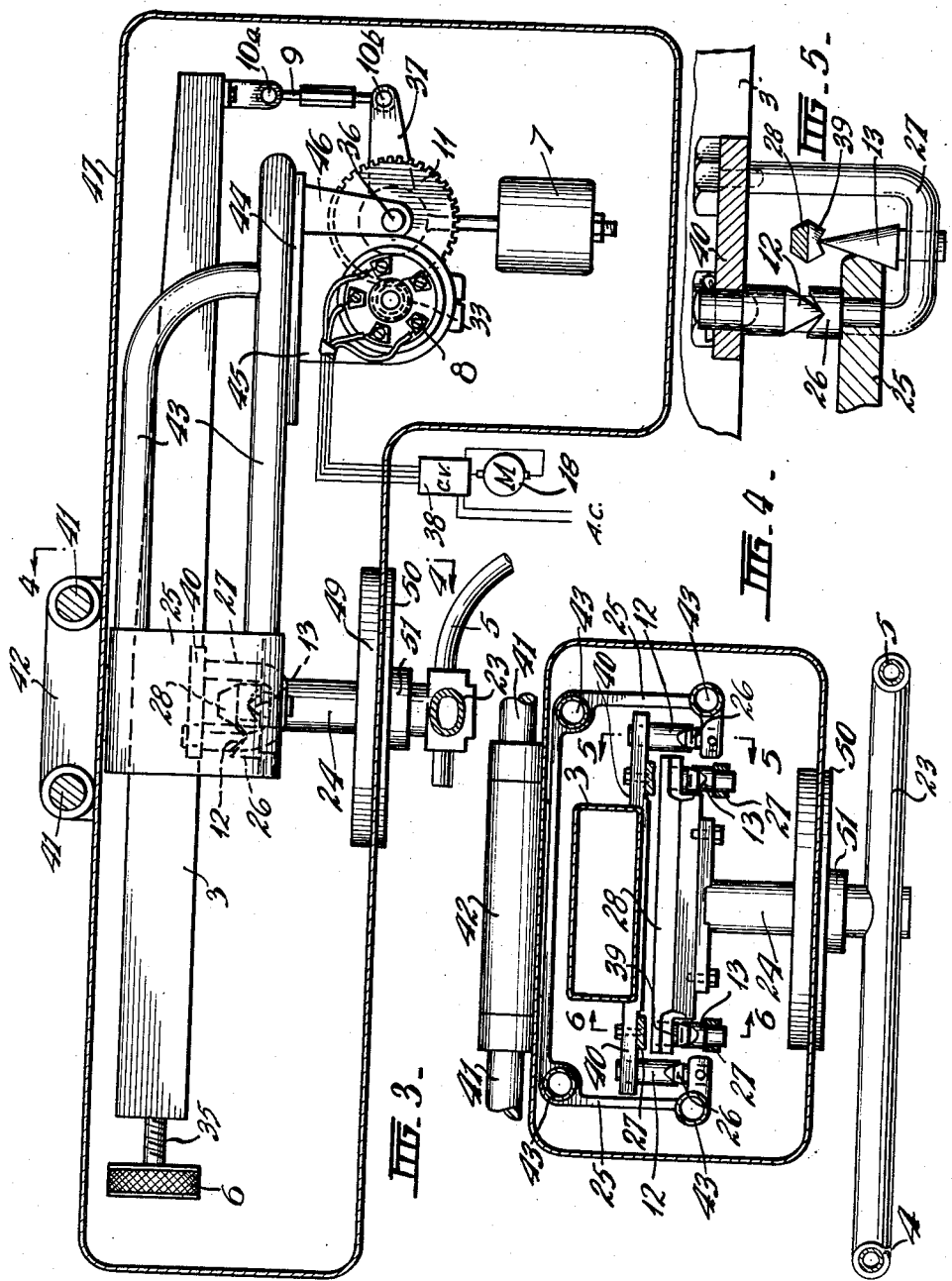

United States Patent Office 3,103,871
Patented Sept. 17, 1963

3,103,871
APPARATUS FOR ADDING ONE SUBSTANCE TO ANOTHER IN CONTROLLED PROPORTIONS
Joseph Czulak, Mount Eliza, Victoria, and Norman Harry Freeman, Moorabbin, Victoria, Australia, assignors to Commonwealth Scientific and Industrial Research Organization, East Melbourne, Victoria, Australia
Filed Aug. 19, 1960, Ser. No. 50,680
Claims priority, application Australia Aug. 20, 1959
5 Claims. (Cl. 99—243)

This invention relates to apparatus for adding one substance to another in controlled proportions, and refers particularly, but not exclusively, to means for the addition of salt to cheese-curd as part of the process for the manufacture of cheddar cheese.

Unlike many varieties of cheese, cheddar cheese is not salted by immersion in brine, but by the addition and mixing of dry salt with the curd prior to the curd being put into hoops or moulds for pressing.

In making cheddar cheese, the usual practice is to salt the curd after it has been milled or cut into strips of about ½" square cross-section and 1 to 6" length. The salting is done by sprinkling by hand the required quantity of salt, usually 2¼–3% by weight over a batch of curd strips in the cheese vat and then mixing the salt with the curd by stirring by hand or by a mechanically-driven stirring device. Stirring or agitation is required to ensure as even as possible salt distribution and also to prevent the individual strips of curd from fusing together into lumps before each of them is coated with salt. The salted curd is then put into hoops or moulds and pressed to form cheese.

This commonly used method of salting requires a considerable amount of heavy manual labour and is essentially a batch process and is therefore time consuming. However, the chief disadvantage is that it is not accurate as evidenced by the variation in the salt content of several cheeses from the same batch. For example, the finished cheddar cheeses from a single batch may have a salt content ranging between 1.2 and 1.7% by weight. The salt content in cheese is an important factor because it bears directly and indirectly on the quality of the cheese in that:

(a) The expulsion of moisture from the curd after salting is greater when the salt content is high, (b) Microorganisms, including those causing spoilage or deterioration, vary in their salt tolerance and low salt contents are less effective in inhibiting their growth, (c) The taste of the cheese varies according to the salt content and the consumer may judge the cheese as satisfactory, as under-salted or over-salted.

Various mechanical devices are used for similar purposes in the food and other industries, but they could not give a satisfactory performance in connection with the addition of salt to cheddar cheese, because of the peculiar nature and behaviour of the main ingredient—the cheese curd.

These peculiarities are:

(a) The strips of curd, if brought into contact with one another prior to being coated with salt on their surfaces, tend to fuse into lumps, thus causing uneven salt distribution. This undesirable fusing together and lumping would occur in any semi-continuous system where the curd is weighed in small batches one after another. To prevent lumping, the strips of curd must be agitated or kept in motion, and so allowed to remain in contact with one another for a very short time only.

(b) The strips of curd continue to lose moisture by drainage and by evaporation. Thus a relatively high air humidity prevails in the vicinity of the curd. Moisture is absorbed from this humid air by salt if this is delivered by a vibrator or other form of open feeding mechanism, and the lumping of salt under these conditions leads to inaccurate salting.

It is the main object of the present invention to provide improved means for the proportionate addition of salt to curd in a process of the type referred to.

It is also an object of the invention to provide accurate means for the salting of curd flowing continuously in a process for the manufacture of cheddar cheese.

In accordance with the invention, apparatus is provided, comprising a conveyor belt unit adapted to be driven at a substantially constant speed and supported by weighing means, feeding means adapted to continuously feed an additive to material which has been carried by the conveyor, and means to control the feeding means so that it supplies the additive at a rate which is a function of the weight of material on the conveyor belt.

Preferably, the feeding means is adapted to supply the additive at a rate which is proportionate to the weight imposed on the conveyor belt. This is preferably effected by driving the feeding means by means of a motor which operates at a speed proportional to the weight of material on the conveyor belt.

The weighing means may comprise a beam balance.

The feeding means may comprise a star wheel driven by a variable speed electric motor. The variable speed electric motor may be controlled by an electronic control unit of known type, the control unit in turn being actuated by suitable linkage from the weighing means. The linkage may comprise an electric remote position indicating device, the output torque of which is greater than its input torque.

One embodiment of the invention which has been devised to control the addition of salt to curd in a cheddar cheese making process will now be described with reference to the accompanying drawings, in which:

FIGURE 1 is a side elevation of apparatus in accordance with the invention,

FIGURE 2 is an end elevation of the apparatus shown in FIGURE 1,

FIGURE 3 is a section along the line 3—3 of FIGURE 1 and a wiring diagram of an electrical control circuit included in the apparatus, FIGURE 4 is a section along the line 4—4 of FIGURE 3, FIGURE 5 is a section along the line 5—5 of FIGURE 4, FIGURE 6 is a section along the line 6—6 of FIGURE 4, FIGURE 7 is a section along the line 7—7 of FIGURE 1, and FIGURE 8 is a section along the line 8—8 of FIGURE 7.

In a cheddar cheese making process, strips of curd from a curd cutting machine are fed on to a weighing conveyor belt 1 (FIGURES 1 and 2) which is mounted on a horizontal frame 34 and is driven continuously at a constant speed by an electric motor 2. The frame 34 carrying conveyor belt 1 is suspended from a sensitive beam balance by means of tubular suspension members 4 and 5 which are connected to the conveyor frame 34 and extend upwardly from the latter (FIG. 1). The upper ends of members 4 and 5 are securely connected to the ends of a cross-arm 23 extending generally parallel to the direction of travel of conveyor 1. The cross arm 23 is rigidly attached, intermediate its ends, to a support tube 24 (FIGS. 3 and 4) which depends from the center of a laterally extending mounting bar 28. The end portions of mounting bar 28 have knife edge bearings 39 at the undersides of the bar 28, and such bearings 39 rest on knife edges 13 (FIGS. 4 and 5). The knife edges 13 are mounted in stirrups 27 which depend from laterally projecting lugs 40 provided at the opposite sides of a balance beam 3. Thus, the frame 34 of conveyor 1 is pivotally suspended from beam 3 at the line of contact of knife edges 13 with bearings 39.

The beam 3 is, in turn, rockably supported by knife edges 12 which are also carried by lugs 40 and rest on knife edge bearings 26 carried by a fixed box-shaped supporting member 25. As is apparent on FIG. 5, the line of contact of knife edges 12 with bearings 26 is spaced from the line of contact of bearings 39 with knife edges 13. Thus, the weight of the conveyor 1 applied to the beam 3 at the knife edges 13 urges the beam to tip about the axis defined by the knife edges 12. The supporting member 25 is rigidly attached to an overhead supporting frame 42 (FIGS. 3 and 4) carried by fixed main supporting bars 41 (FIG. 1). Tubular frame members 43 also extend from member 25 and carry a mounting plate 44 from which a mounting bracket 45 and a yoke-type bearing block 46 (FIG. 3) are suspended.

One end of the beam 3 has a threaded extension 35 on which a knurled nut 6 is threadably engaged to form a beam adjusting weight for initially balancing the beam 3. The other end of beam 3 is pivotally connected at 10a to an adjustable link 9 which is, in turn, pivotally connected at 10b to an arm 37 extending from a shaft 36 and secured to the latter. Shaft 36 is rotatable in bearings carried by block 46 and carries a balance control weight 7, which tends to hang vertically down, and a gear 11. The gear 11 meshes with a pinion 33 (appearing in broken lines on FIG. 3) coupled to the rotor of a variable output transformer 8 commonly referred to as a Selsyn transmitter and which provides a signal voltage varying with the angle of rotation of its rotor. The gear 11 and pinion 33 multply the angle of rotation of the rotor of transformer 8 in relation to the angular displacement of shaft 36 and hence with respect to the rocking of beam 3 on knife edges 12, thereby to give increased sensitivity.

It will be apparent that the weight of the conveyor 1 and of the cured thereon tends to rock the beam 3 in the direction depressing the end thereof connected to link 9, that is, in the clockwise direction as viewed on FIG. 3, but such rocking of the beam is resisted by the balance weight 7 which, of course, tends to remain in the illustrated vertically suspended position. Thus, an increasing weight of curd on conveyor 1 rocks beam 3 increasingly in the clockwise direction and effects corresponding angles of rotation of the rotor of transformer 8. The adjustable link 9 between beam 3 and arm 37 permits adjustment of the zero or initial position of the rotor of transformer 8, while the adjustable weight 6 permits balancing of the beam 3 for the unloaded condition of the belt conveyor.

In order to protect the working parts of the beam balance or weighing assembly, the latter is enclosed by a casing 47, and the support tube 24 movably enters the casing through a relatively large opening in the latter which is sealed by a flexible membrane secured, at its outer periphery, to casing 47 by rings 49 and 50 and clamped around tube 24 by a collar 51 (FIGS. 3 and 4).

Curd from the weighing conveyor 1 is fed into a rotary mixing drum 14 together with salt from a salt chute 15. The mixing drum 14 is supported on rollers 29 and 30 and is rotated by an electric motor 32 driving a roller 31 in frictional contact with the exterior of the drum. In order to ensure thorough mixing of the curd and salt, the mixing drum 14 is provided internally with longitudinally extending mixing vanes (not shown). Salt is stored in a covered hopper 16 and is fed to the salt chute 15 through a metering star wheel 17 which is driven by a variable speed geared motor 18 so that the rate of feeding of the salt is proportional to the speed of the motor.

The star wheel 17 fits closely within a cylindrical housing 53 and is provided with longitudinal pockets 54 which receive salt from the hopper 16 through a narrow inlet opening 55 in the housing and tip salt into the mixing drum 14 through a narrow outlet opening 56. This arrangement provides a very accurate feeding means for the salt as the close fit of the pockets within the housing ensures that each pocket will deliver a uniform volume of salt through the outlet opening 56. The geared motor 18 is controlled by an electronic control unit 38 (FIGURE 3) which is adjusted by the Selsyn transmitter or variable output transformer 8 so that the speed of the geared motor 18 is directly proportional to the rotation of the shaft 36 geared to the rotor of transformer 8 which in turn is proportional to the weight of curd on the weighing conveyor 1.

This type of control mechanism is convenient in use because it may readily be assembled from standardised and readily obtained component units. For example, the variable output transformer 8 is preferably a "magslip" Selsyn type transmitter mark II and the control unit 38 is preferably a "Reliance V. S. Junior," both of which are commercially available from the Reliance Electric and Engineering Co., Cleveland, Ohio, but it is to be understood that other mechanisms may be used provided that the force to operate such mechanism is very small.

Free flow of the salt is ensured by an electrically driven salt stirrer 19 fitted inside the hopper 16 and an internal electrical heating element 20 fitted within the salt metering wheel 17.

Prior to operation, the weighing assembly is adjusted by means of the beam adjusting weight 6 so that without any weight on the weighing conveyor the balance beam 3 is at zero position. With the beam 3 at zero position the balance control weight 7 exerts no controlling force on the beam and the rotor of the transformer 8 is in such position that no electric power is supplied from the electronic control unit to the electric geared motor 18 and consequently the salt metering wheel 17 is at rest.

Curd is fed onto the weighing conveyor 1 from an elevating conveyor 21 and is retained in position by the shroud 22 which is fixed to the machine framework.

The weight of the curd carried by the weighing conveyor 1 causes a displacement of the balance beam 3. The extent of this displacement is dependent on the weight carried and on the controlling force of the balance control weight 7. The weighing assembly is so designed that when the flow rate of curd on the weighing conveyor 1 is at a maximum, the balance control weight 7 is displaced 15° from the vertical. Within this angle of displacement, the controlling force exerted on the balance beam 3 is for practical purposes directly proportional to the weight carried. As the beam 3 is displaced, the rotor of the variable output transformer 8 is given a corresponding rotation, whereby the output voltage of the transformer 8 is made to vary in proportion to the angular displacement or rotation of its rotor. The output voltage of the transformer 8 is supplied as a control signal (which is proportional to the weight on the conveyor 1) to the electronic control unit 38 which amplifies the control signal and supplies a proportionate D.C. voltage to the variable speed motor 18 driving the salt metering wheel 17 (FIGURE 7). The speed of the electric geared motor 18 is also for practical purposes a linear function of the angular displacement of the rotor of transformer 8 within the angle from 0–60°. The weight of salt delivered by the salt metering wheel 17 is, for practical purposes, directly proportional to its speed of rotation in the range 0–11 r.p.m. in the case of the star wheel illustrated in FIGURE 8.

Because of the above linear relationships, the weight of salt delivered into the mixing drum 14 can be adjusted so as to be in the correct predetermined proportion to the weight of curd carried into the same drum by the weighing belt conveyor 1.

For example, the ratio of the weight of the curd to the weight of the salt can be 115:3 which represents the the usual proportion in manufacturing practice. This ratio can be varied by adjusting the electronic control unit so that, for the same angular displacement of the rotor of transformer 8, the speed of the electric geared motor is increased or reduced to the desired extent.

It is important to note that the rate of delivery of the curd to the conveyor belt can vary and that the salting device accurately apportions the salt to the varying quantity of curd carried by the weighing conveyor. Because very high accuracy is required, the weighing device must be equally sensitive to weight varying from many pounds to as low as 1 oz. For this reason apportioning devices operating on the principle of displacement of a belt by the load carried by the belt would not be sufficiently sensitive.

We claim:

1. Apparatus for adding salt to cheese curd in controlled proportions comprising a conveyor assembly including a conveyor belt, support means carrying said conveyor belt and drive means carried by said support means and operative to move the conveyor belt at a substantially constant speed, means operative to feed cheese curd onto the conveyor belt, a beam balance having a rockable beam, means suspending said support means of the conveyor belt from said beam of the beam balance including knife edges at which the load of the conveyor belt is transmitted to said beam to cause rocking of the latter, a balance control weight operatively connected to said beam to resist rockable displacement of the beam, a mixing drum into which cheese curd is fed from the conveyor belt, means operative to rotate said mixing drum, a hopper to hold salt, a stirring device in said hopper, a star wheel feeding device operative to feed salt from said hopper to the cheese curd in said mixing drum, said star wheel feeding device comprising a cylindrical housing, a rotatable wheel member fitting closely within said housing, an inlet at the top of said housing, an outlet at the bottom of said housing and salt-receiving pockets in said rotatable wheel member, an electric motor to rotate said rotatable wheel member in said star wheel feeding device, an electronic control unit to control the speed of said motor and thereby control the rate of feed of salt to the cheese curd, and a variable output transformer connected with said beam so as to be actuated in response to rocking of the latter and having a continuously variable output voltage corresponding to the extent of rocking of said beam, which output voltage is fed to the electronic control unit to continuously control the speed of said motor in accordance with variations in the position of said beam of the beam balance whereby the salt is added to the cheese curd in the mixing drum at a rate substantially proportional to the weight of the cheese curd on the conveyor belt, said conveyor assembly and said means suspending said conveyor being completely supported by said beam of the beam balance.

2. Apparatus for adding salt to cheese curd in controlled proportions comprising a conveyor assembly including a conveyor belt, support means for the conveyor belt and drive means carried by said support means and operative to move the conveyor belt at a substantially constant speed, means adapted to feed cheese curd on to the conveyor belt, a beam balance having a rockable beam, means suspending said support means of the conveyor assembly from said beam to cause rocking of the latter, means operatively connected to said beam of the beam balance and tending to resist rocking displacement of the beam under the load imposed by said conveyor assembly and the cheese curd on the conveyor belt, means balancing the weight of the conveyor assembly whereby the beam of the beam balance is disposed in a predetermined position when the conveyor belt is empty, a mixing drum into which cheese curd is fed from the conveyor belt, means operative to rotate said mixing drum, a hopper to hold salt, a stirring device in said hopper, a rotary feeding device operative to feed salt from the hopper to the cheese curd in said mixing drum while preventing exposure of the salt in the hopper to the atmosphere in said drum, said rotary feeding device including a cylindrical housing, a rotatable member fitting closely within said housing, an inlet at the top of said housing, an outlet at the bottom of said housing and salt-receiving pockets in said rotatable member, means operative to rotate said rotatable member of the feeding device, and control means continuously responsive to the position of the beam of the beam balance to continuously vary the speed of the rotary feeding device whereby the salt is added to the cheese curd in the mixing drum at a rate substantially proportional to the weight of the cheese curd on the conveyor belt, said conveyor assembly and said means suspending the support means of the conveyor being completely supported from said beam of the beam balance.

3. Apparatus for adding salt to cheese curd in controlled proportions comprising a conveyor assembly including a conveyor belt, support means for the conveyor belt and drive means carried by said support means and operative to move the conveyor belt at a substantially constant speed, means for feeding cheese curd onto said conveyor belt, a beam balance having a rockable beam, means suspending said support means of the conveyor assembly from said beam, balance means connected to said beam and tending to resist rocking displacement of the beam under the load of said conveyor assembly and the cheese curd on the conveyor belt, means balancing the weight of said conveyor assembly whereby the beam of the beam balance is disposed in a predetermined position when the conveyor belt is empty, a mixing drum into which cheese curd is fed from the conveyor belt, means operative to rotate said mixing drum, a hopper to hold salt, a stirring device in said hopper, a rotary feeding device operative to feed salt from the hopper to the cheese curd in said mixing drum while preventing exposure of the salt in the hopper to the atmosphere in said drum, an electric motor to rotate said feeding device, an electronic control unit to control the speed of said motor and thereby control the rate of feed of salt to the cheese curd, a variable output transformer having, within set limits, an infinitely and continuously variable output voltage, means connecting said transformer with said beam so that said output voltage is varied in accordance with rocking of said beam from said predetermined position, and means feeding said output voltage to said electronic control unit to vary infinitely, within set limits, and to continuously control the speed of said motor in accordance with variations in the position of said beam of the beam balance whereby the salt is added to the cheese curd in the mixing drum at a rate substantially proportional to the weight of the cheese cured on the conveyor belt, said conveyor assembly and said means suspending said support means completely supported from said beam of the beam balance.

4. Apparatus for adding an additive to another substance in controlled proportions comprising a conveyor assembly including a conveyor belt, support means carrying said conveyor belt and drive means also carried by said support means and operative to move the conveyor belt at a substantially constant speed, means operative to feed the substance onto the conveyor belt, a beam balance having a rockable beam, means suspending said support means of the conveyor assembly from said beam of the beam balance and including knife edges transmitting the load of the conveyor assembly and of the substance on the conveyor belt to said beam, a balance control weight connected to said beam and suspended in such manner as to tend to resist rockable displacement of said beam by said load, a mixing drum into which the substance is discharged from the conveyor belt, a hopper to hold the additive, a star wheel feeding device operative to feed the additive from said hopper to the substance in said mixing drum, said star wheel feeding device comprising a cylindrical housing having an inlet and outlet at the top and bottom, respectively, a rotatable wheel member fitting closely within said housing and having additive receiving pockets, an electric motor to rotate said rotatable wheel member in said star wheel feeding device, an electronic control unit to control the speed of said motor and thereby control the rate of feed of the additive to the substance, a variable output transformer having, within set limits, an infinitely and continuously variable output voltage, means connecting said transformer with said beam to vary said output voltage in accordance with rocking of the beam, and means feeding said output voltage to said electronic control unit to vary infinitely, within set limits, and to continuously control the speed of said motor in accordance with rocking of said beam whereby the additive is added to the substance in the mixing drum at a rate substantially proportional to the weight of the substance on the conveyor belt, said conveyor assembly and said means suspending said support means including said knife edges being completely supported from said beam of the beam balance.

5. Apparatus for adding an additive to another substance in controlled proportions comprising a conveyor assembly including a conveyor belt, support means for the conveyor belt and drive means also carried by said support means and operative to move the conveyor belt at a substantially constant speed, means for feeding the substance onto the conveyor belt, a beam balance having a rockable beam, means suspending said support means of the conveyor assembly from said beam, means connected to said beam and tending to resist rocking displacement of the beam under the load imposed by said conveyor assembly and the substance on the conveyor belt, means balancing the weight of the conveyor assembly whereby the beam of the beam balance is disposed in a predetermined position when the conveyor belt is empty, a mixing drum into which the substance is fed from the conveyor belt, means operative to rotate said mixing drum, a hopper to hold the additive, a rotary feeding device operative to feed the additive from the hopper to the substance in said mixing drum while preventing exposure of the additive in the hopper to the atmosphere in said drum, said rotary feeding device including a cylindrical housing having an inlet and an outlet at the top and bottom, respectively, and a rotatable member fitting closely within said housing having additive receiving pockets, means operative to rotate said feeding device, and control means continuously responsive to the position of the beam of the beam balance to vary infinitely, within set limits, and continuously control the speed of the rotary feeding device whereby the additive is added to the substance in the mixing drum at a rate substantially proportional to the weight of the substance on the conveyor belt, said conveyor assembly and said means suspending the support means of the conveyor assembly being completely supported from said beam of the beam balance.

References Cited in the file of this patent
UNITED STATES PATENTS

| | | |
|---|---|---|
| 1,069,771 | Dougan | Aug. 12, 1913 |
| 2,101,417 | Waldoogel | Dec. 7, 1937 |
| 2,286,554 | Lieberman | June 16, 1942 |
| 2,299,717 | Emmons et al. | Oct. 20, 1942 |
| 2,547,291 | Styll | Apr. 3, 1951 |
| 2,763,399 | Heacock | Sept. 18, 1956 |
| 2,911,719 | Nessler et al. | Aug. 7, 1959 |
| 2,932,430 | Dennis | Apr. 12, 1960 |
| 2,942,343 | Sjoholm et al. | June 28, 1960 |